(12) United States Patent
Huang et al.

(10) Patent No.: US 11,760,897 B2
(45) Date of Patent: Sep. 19, 2023

(54) COATING COMPOSITIONS INCLUDING A SAG CONTROL AGENT AND WAX

(71) Applicant: AXALTA COATING SYSTEMS IP CO., LLC, Wilmington, DE (US)

(72) Inventors: Yongqing Huang, Philadelphia, PA (US); Delson Trindade, Philadelphia, PA (US); Beatriz E. Rodriguez-Douglas, Philadelphia, PA (US); Candice Pelligra, Philadelphia, PA (US); Gary W. Nickel, Philadelphia, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 352 days.

(21) Appl. No.: 16/942,234

(22) Filed: Jul. 29, 2020

(65) Prior Publication Data

US 2021/0032491 A1 Feb. 4, 2021

Related U.S. Application Data

(60) Provisional application No. 62/880,276, filed on Jul. 30, 2019.

(51) Int. Cl.
| | |
|---|---|
| *C09D 133/08* | (2006.01) |
| *B05D 3/12* | (2006.01) |
| *B05D 7/00* | (2006.01) |
| *C08K 3/34* | (2006.01) |
| *C08K 5/21* | (2006.01) |
| *C08K 3/08* | (2006.01) |

(52) U.S. Cl.
CPC ............ *C09D 133/08* (2013.01); *B05D 3/12* (2013.01); *B05D 7/536* (2013.01); *C08K 3/346* (2013.01); *C08K 5/21* (2013.01); *C08K 2003/0812* (2013.01)

(58) Field of Classification Search
CPC combination set(s) only.
See application file for complete search history.

(56) References Cited

U.S. PATENT DOCUMENTS

| | | |
|---|---|---|
| 4,888,373 A | 12/1989 | Abrams |
| 6,111,001 A | 8/2000 | Barancyk et al. |
| 6,437,056 B1 | 8/2002 | Dahm et al. |
| 6,649,706 B1 | 11/2003 | Heid et al. |
| 6,652,915 B1 | 11/2003 | Baumgart et al. |
| 6,652,916 B1 | 11/2003 | Baumgart et al. |
| 6,685,985 B2 | 2/2004 | Boisseau et al. |
| 6,861,150 B2 | 3/2005 | Ramesh et al. |
| 7,576,151 B2 | 8/2009 | Brinkhuis et al. |
| 7,632,882 B2 | 12/2009 | Lenges et al. |
| 7,741,510 B2 | 6/2010 | Lenges et al. |
| 7,799,858 B2 | 9/2010 | Brinkhuis et al. |
| 7,851,530 B2 | 12/2010 | Brinkhuis et al. |
| 8,030,513 B2 | 10/2011 | Lenges et al. |
| 8,207,268 B2 | 6/2012 | Brinkhuis |
| 8,686,090 B2 | 4/2014 | Green et al. |
| 8,742,052 B2 | 6/2014 | Brinkhuis |
| 9,206,334 B2 | 12/2015 | Bihne et al. |
| 9,267,054 B2 | 2/2016 | Wegner et al. |
| 9,365,738 B2 * | 6/2016 | December et al. .. C09D 133/12 |
| 9,605,164 B2 | 3/2017 | Huang et al. |
| 9,856,384 B2 | 1/2018 | Uhlianuk et al. |
| 2005/0176880 A1 * | 8/2005 | Fujii et al. ............... C08K 3/00 524/589 |
| 2006/0155021 A1 | 7/2006 | Lenges et al. |
| 2008/0153924 A1 | 6/2008 | Caron et al. |
| 2014/0147596 A1 | 5/2014 | Wegner et al. |
| 2015/0038620 A1 | 2/2015 | Lavalaye et al. |
| 2015/0105511 A1 | 4/2015 | Huang et al. |
| 2017/0275488 A1 | 9/2017 | Manka |

FOREIGN PATENT DOCUMENTS

| | | |
|---|---|---|
| CN | 101137692 A | 3/2008 |
| CN | 103987797 A | 8/2014 |
| JP | 2002220562 A | 8/2002 |
| WO | 2006076715 A1 | 7/2006 |

\* cited by examiner

*Primary Examiner* — Ling Siu Choi
*Assistant Examiner* — Huihong Qiao
(74) *Attorney, Agent, or Firm* — Lorenz & Kopf, LLP

(57) ABSTRACT

Solvent-borne coating compositions and methods for forming coated substrates are provided. In one example, a solvent-borne coating composition includes a solvent(s), a colorant(s), a binder including one or more resins, a sag control agent, and a wax dispersion. The sag control agent includes urea crystals that are present in an amount of from about 0.5 wt. % to about 6 wt. % based on the weight of the binder. The wax dispersion includes ethylene vinyl acetate-based wax particles present in an amount of from about 3 wt. % to about 8 wt. % based on the weight of the binder. The solvent-borne coating composition has a non-volatile content of from about 11 to about 30 vol. % based on the volume of the solvent-borne coating composition.

15 Claims, No Drawings

COATING COMPOSITIONS INCLUDING A SAG CONTROL AGENT AND WAX

CROSS-REFERENCE TO RELATED APPLICATIONS

This application is related to and claims all available benefit of U.S. Provisional Patent Application 62/880,276 filed Jul. 30, 2019, the entire contents of which are herein incorporated by reference.

TECHNICAL FIELD

The technical field relates generally to coatings, and more particularly to solvent-borne coating compositions including a sag control agent and wax, such as an ethylene vinyl acetate (EVA) wax and/or a polyamide (PA) wax.

BACKGROUND

The paint and coatings industry is still faced with the challenge to satisfy the consumer's desire for improved appearance of the coating compositions, particularly with respect to effect coatings. Typically, flake pigments, such as aluminums or pearlescent pigments, are used to give the finish coating a metallic effect. These flakes have a larger diameter compared to their thickness and typically should lay flat against substrates to provide a brilliant appearance. Disorientation of the flakes likely causes a darker and/or speckled appearance. This becomes more challenging in repairing or refinishing parts to match the color of the adjacent parts. Disorientation of the flakes can lead to irregular areas of lightness variation in total color impression. This is more apparent for light metallic colors on relatively large body panels. In the coatings industry, this undesired appearance is commonly referred to as mottling.

Flake orientation is influenced by application parameters and rheology properties of the coating itself. Coating compositions with sufficient flake control capability, e.g., suitable rheology and viscosity properties, are desirable so that a paint sprayer or a spraying machine can easily and consistently apply the coating compositions.

Rheology control agents can be incorporated into coating compositions, changing the paint flow profile by forming temporary and reversible spatial structures by bridging either polymer molecules or pigment particles. The more desired rheology control agents in coatings are typically thixotropic (i.e., thixotropes). Many compounds are known and used as thixotropes in coatings compositions, such as modified hydrogenated castor oils, sag control agents based on urea compounds, crosslinked polymeric microparticles, various organoclays (organically modified phyllosilicate, derived from a naturally occurring clay mineral), silicas, or synthetic polymers containing ionic or associative groups such as polyvinyl alcohol, poly(meth)acrylic acid, ethylene-maleic anhydride copolymers, or polyvinylpyrrolidone polymers. Unfortunately, increasing the amount of thixotropes can leads to undesired properties. For example, higher amounts of wax, organoclays or silicas can cause more texture or orange peel appearance which becomes even more severe when the volume solids of the coating increases. Higher wax levels can also lead to weaker film properties, especially recoat adhesion.

Besides using thixotropes and controlling solvent evaporation profile, lower ready-to-spray (RTS) solid level (<11% by volume) have been used in refinish effect colors to achieve desired flake control through the benefit of volume shrinkage. However, the lower RTS volume solids might lead to poorer hiding and thus lower productivity. In addition, it usually releases more volatile organic compounds (VOCs) during application, which is not environmentally friendly. Some thixotropes are designed to work in high solids coating systems. For example, U.S. Pat. No. 4,311,622 describes using SCA containing urea crystals in high solids coating systems (>70% by weight).

Accordingly, it is desirable to provide a solvent-borne coating composition that achieves an improved balance of hiding power and mottling free and smooth appearance with a ready-to-spray (RTS) solids level of 11% or higher by volume. Furthermore, other desirable features and characteristics of the present disclosure will become apparent from the subsequent detailed description and the appended claims, taken in conjunction with this background.

SUMMARY

Solvent-borne coating compositions and methods for forming a coated substrate are provided herein. In accordance with an exemplary embodiment, a solvent-borne coating composition includes one or more solvents, one or more colorants, a binder including one or more resins, a sag control agent, and a wax dispersion. The sag control agent includes urea crystals that are present in an amount of from about 0.5 wt. % to about 6 wt. % based on the weight of the binder. The wax dispersion includes ethylene vinyl acetate (EVA)-based wax particles that are present in an amount of from about 3 wt. % to about 8 wt. % based on the weight of the binder. The solvent-borne coating composition has a non-volatile content of from about 11 vol. % to about 30 vol. % based on the volume of the solvent-borne coating composition.

In one aspect, the non-volatile content of the solvent-borne coating composition is from about 12 vol. % to about 25 vol. % based on the volume of the solvent-borne coating composition.

In another aspect, the sag control agent and the wax dispersion are present in a combined total amount of less than or equal to about 11 wt. % based on the weight of the binder.

In yet another aspect, the urea crystals and the EVA-based wax particles are present in a combined total amount of from about 3.5 wt. % to about 10 wt. % based on the weight of the binder.

In one aspect, the sag control agent comprises a reaction product of an amine and an isocyanate.

In another aspect, the isocyanate is selected from the group of 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophorone diisocyanate, adduct isophorone diisocyanate, adduct of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenyl methane-4,4'-diisocyanate, adduct of toluene diisocyanate, and combinations thereof.

In yet another aspect, the amine is selected from the group of benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, aniline, and combinations thereof.

In one aspect, the amine includes benzyl amine and the isocyanate includes 1,6-hexamethylene diisocyanate.

In another aspect, the one or more colorants includes a flake pigment.

In yet another aspect, the flake pigment includes at least one flake pigment selected from the group of aluminum flakes, mica flakes, and pearlescent flakes.

In one aspect, the one or more resins comprises one or more resins selected from the group of acrylic resin, polyester-extended acrylic resin, acrylic polyol resin, polyester resin, polyester-extended polymer, and cellulosic resin.

In another aspect, the one or more resins includes polyester resin(s) that is present in an amount of less than or equal to about 75 wt. % based on the weight of the binder.

In yet another aspect, when the solvent-borne coating composition is sprayed on a substrate and subsequently cured for 7 days at room temperature to form a basecoat, the basecoat has a Persoz hardness of more than about 40 seconds as measured in accordance with ASTM-D4366.

In one aspect, the solvent-borne coating composition further comprises at least one additive selected from the group of a crosslinking agent, an ultraviolet light stabilizer, an ultraviolet light absorber, an antioxidant, a hindered amine light stabilizer, a leveling agent, a rheological agent, a thickener, an antifoaming agent, and a wetting agent.

In accordance with an exemplary embodiment, a method for forming a coated substrate includes spraying the solvent-borne coating composition onto a substrate, and drying, curing, and/or baking the solvent-borne coating composition on the substrate to form a first coating layer on the substrate.

In one aspect, the method further includes applying a clearcoat overlaying one of the solvent-borne coating composition and the first coating layer, and drying, curing, and/or baking the clearcoat to form the coated substrate.

In another aspect, the method further includes nib sanding the first coating layer prior to applying the clearcoat.

In yet another aspect, the coated substrate is formed having a mottling appearance of less than about 4.5 as measured by a cloud-runner instrument at an aspecular angle of about 15 degrees.

In an exemplary embodiment, a solvent-borne coating composition includes one or more solvents, one or more colorants, a binder including one or more resins, a sag control agent, and a wax dispersion. The sag control agent includes urea crystals that are present in an amount of from about 0.5 wt. % to about 6 wt. % based on the weight of the binder. The wax dispersion includes polyamide (PA)-based wax particles present in an amount of from about 1 wt. % to about 5 wt. % based on the weight of the binder, wherein the solvent-borne composition has a non-volatile content of from about 11 vol. % to about 30 vol. % based on the volume of the solvent-borne coating composition.

In one aspect, the sag control agent and the wax dispersion are present in a combined total amount of from about 2.5 wt. % to about 9 wt. % based on the weight of the binder.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments contemplated herein relate to solvent-borne coating compositions. In an exemplary embodiment, a solvent-borne coating composition having from about 11 to about 30 volume percent (vol. %), for example more than 11 vol. % up to 30 vol. %, such as from about 12 vol. % to about 25 vol. % nonvolatile content is provided that advantageously achieves an improved balance of hiding power and mottling free and smooth appearance. The solvent-borne coating composition includes a solvent, a colorant, a binder, a sag control agent, and a wax dispersion. In an exemplary embodiment, the sag control agent (SCA) includes urea crystals that are present in an amount of from about 0.5 to about 6 wt. % based on the weight of the binder. Further, in an exemplary embodiment, the wax dispersion includes ethylene vinyl acetate (EVA)-based wax particles present in an amount of from about 3 to about 8 wt. %, such as from about 4 to about 7 wt. %, or polyamide (PA)-based wax particles present in an amount of from about 1 to about 5 wt. % based on the weight of the binder. In an exemplary embodiment, the SCA and the wax dispersion comprising EVA-based wax particles are present in a combined total amount of less than or equal to about 11 wt. %, such as from about 3.5 wt. % to about 10 wt. % based on the total weight of the binder. For example, the urea crystals and the EVA-based wax particles are present in a combined total amount of less than or equal to about 11 wt. %, such as from about 3.5 wt. % to about 10 wt. %. In an exemplary embodiment, the SCA and the wax dispersion comprising PA-based wax particles are present in a combined total amount of from about 2.5 wt. % to about 9 wt. % based on the total weight of the binder. For example, the urea crystals and the PA-based wax particles are present in a combined total amount of from about 2.5 wt. % to about 9 wt. % based on the total weight of the binder.

As used herein, the term "coating composition" is understood to mean any type of coating applied to a substrate. The substrate can be made of metal, plastic or other polymer materials, wood, ceramic, clay, concrete, stone, or other man-made or natural materials. Examples of substrates include, but are not limited to, a vehicle such as an automobile, a truck, or the like, a home appliance such as a refrigerator, a washing machine, a dishwasher, a microwave oven, a cooking and/or baking oven(s), or the like, an electronic appliance such as a television set, a computer, an electronic game set, an audio and/or video equipment, or the like, a recreational equipment such as a bicycle, ski equipment, an all-terrain vehicle, or the like, and a home and/or office furniture such as a table, a file cabinet, or the like. The substrate can also include one or more existing coating layers, or alternatively, may be a bare substrate that is substantially free of any existing coating layers.

In an exemplary embodiment, the coating composition can be used as a primer(s), a sealer(s), a topcoat(s), a basecoat(s), a one-stage and/or two-stage coating(s), and/or the like. For vehicle coating, for example, the coating composition can be used for vehicle original equipment manufacturing (OEM) coatings and/or for repairing or refinishing coatings of vehicles and vehicle parts.

In an exemplary embodiment, the coating composition of the present disclosure is used as the basecoat, in a basecoat/clearcoat process. In such a process, a layer of the coating composition is applied as a basecoat to a previously coated or uncoated substrate by spraying, electrostatic spraying, roller coating, dipping, or brushing. The coating composition is optionally flashed to remove at least a portion of the solvent. Optionally, another layer of the basecoat composition is applied, followed by an optional flash step. The layer or layers of basecoat composition is then overcoated with a layer of clearcoat composition. Optionally, the clearcoat layer is flashed. Optionally, more than one layer of the clearcoat may be applied to the basecoat, where each application is followed by an optional flash step. The combined basecoat and clearcoat layers are heated to about 60° C. to 200° C. for 10 minutes to 60 minutes to dry and cure the applied layers. In an exemplary embodiment, as used herein the phrase or term "dry and cure" or "cure" is understood to mean that a majority (e.g., greater than 50 percent) of the solvent(s) has been removed and that the crosslinkable and/or crosslinking components are substantially crosslinked, although it is understood that some additional crosslinking may occur after the curing process.

In an exemplary embodiment, as used herein the term "colorant" is understood to mean any material that when added to a coating composition, causes a color change of the coating. Non-limiting examples of a colorant include a dye, a pigment, a mixture of dyes, a mixture of pigments, or a combination thereof. Typical colorant pigments include, for example, metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbozole violet, isoindolinones, isoindolones, thioindigo reds, and benzimidazolinones, flake pigments such as aluminum flakes, mica flakes, pearlescent flakes, or a combination thereof. In an exemplary embodiment, the colorant includes a flake pigment. For example, the colorant includes at least one flake pigment selected from the group of aluminum flakes, mica flakes, and pearlescent flakes.

The colorant may be produced, for example, by combining one or more pigments with one or more resins and one or more solvents. The resin(s) can be of the general class of acrylics, polyesters, alkyds and the like and provide the functions of wetting the pigment, aiding in grinding or mixing, and facilitating paint compatibility. The colorant also may include dispersant polymers of the acrylic and/or polyester type with polar, ionic, aromatic, basic, or acidic functional groups. The dispersant polymers are selected for various functions, for example, wetting and/or stabilizing the pigments in the colorant. The colorant further may include additives that function as rheology-imparting materials such as organophilic phyllosilicates or hydrophobic fumed silica to prevent settling and improve suspension of the pigments.

In an exemplary embodiment, as used herein, the term "solvent" is understood to refer to a volatile component(s) in a coating composition. The solvents can be VOC-exempt or non-exempt. Non-limiting examples of suitable solvents include ketones such as acetone, methyl ethyl ketone, methyl isobutyl ketone, methyl amyl ketone, methyl isoamyl ketone, and diisobutyl ketone, esters such as ethyl acetate, n-butyl acetate, t-butyl acetate, isobutyl acetate, amyl acetate, and ethyl 3-ethoxy propionate, alcohols such as ethanol, isopropanol, butanol, and pentanol, glycol ethers such as propylene glycol methyl ether, propylene glycol monomethyl ether acetate, and propylene glycol monobutyl ether acetate, aromatic hydrocarbons such as toluene, xylene, and aromatic 100, and aliphatic hydrocarbons such as heptane, petroleum naphtha, and VM&P naphtha (varnish makers and painter naphtha). VOC exempt solvents can include acetone, methyl acetate, t-butyl acetate, P-chlorobenzotrifluoride (PCBTF) or a combination thereof. Water is also a VOC exempt solvent. In an exemplary embodiment, if water is present in the solvent-borne coating composition, the water content is less than 5 wt. %, for example less than 2 wt. %, based on the total weight of the coating composition.

In an exemplary embodiment, the binder or resin(s) means any of a class of nonvolatile, solid or semisolid organic substances that may include or consist of amorphous mixtures of natural oil obtained directly from certain plants as exudations, or resins prepared by polymerization of simple molecules. Resins include, but are not limited to, acrylic resins, polyester-extended acrylic resins, acrylic polyol resins, polyester resins, polyester-extended polymers and cellulosic resins. In an exemplary embodiment, the binder or resin(s) includes polyester resin(s) that is present in an amount of less than or equal to about 75 wt. % based on the weight of the binder.

Particularly useful hydroxyl-containing acrylic polymers are composed of polymerized monomers of alkyl methacrylates and alkyl acrylates, each having 1-12 carbon atoms in the alkyl groups, isobornyl methacrylate, isobornyl acrylate, hydroxyl alkyl methacrylate and hydroxyl alkyl acrylate, each having 1-4 carbon atoms in the alkyl group, styrene or any mixture of any of the above monomers. In an exemplary embodiment, the acrylic polymers have a weight average molecular weight ($M_w$) of 2,000 to 50,000 Daltons and a glass transition temperature (Tg) of from −20° C. to 100° C.

"Acrylic polyol" is understood to mean a polymer formed from a monomer mixture where the monomer mixture contains greater than 50 percent by weight of acrylate or methacrylate monomers. Further, the polymer has on average more than 1.0 hydroxyl groups per molecule.

"Polyester-extended acrylate" monomer is understood to mean a monomer of the formula;

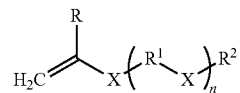

where each X is independently selected from the group C(O)O and OC(O), R is H or $CH_3$, $R^1$ is alkyl, aryl, alkylaromatic, or aromaticalkyl, $R^2$ is hydroxy terminated alkyl, aryl, alkylaromatic, or aromaticalkyl, and n is an integer in the range of from 1 to 20. In an exemplary embodiment, the polyester-extended acrylic monomer is a reaction product of 2-hydroxyethyl acrylate or 2-hydroxyethyl methacrylate with caprolactone. One such product is commercially available from Dow Carbide as TONE M-100®.

Examples of polyesters include polyesters that are the esterification product of one or more aliphatic or aromatic polycarboxylic acids, and one or more aliphatic polyols, but may also incorporate anhydrides, monoacids, monoalcohols, or lactones. Examples of carboxylic acid or anhydride components include aliphatic diacids having 0-12 carbon atoms between the acid groups, phthalic anhydride, isophthalic acid, terephthalic acid, hexahydrophthalic anhydride, benzoic acid, and coconut fatty acid. Examples of hydroxyl components include aliphatic glycols having 0-6 carbon atoms between the hydroxyl groups, glycerine, trimethylolpropane, pentaerythritol, dimethylolpropionic acid, cyclohexanol, and epsilon-caprolactone. In an exemplary embodiment, the polyester has a weight average molecular weight ranging from 1500 to 20,000 Daltons and a Tg of from about −50° C. to about 30° C.

"Polyester-extended polymer" is understood to mean a polymer that has, on average, at least one polyester-extended monomer per polymer chain.

Examples of cellulosic resins include the cellulose acetate butyrate types and the cellulose acetate propionate types. A binder solution containing a film-forming binder resin(s) and a solvent(s). The solvent(s) of the binder solution includes, but is not limited to, any of the solvents or a combination of solvents described above.

In a further exemplary embodiment, the coating composition contemplated herein contains a reducer. A reducer is used to reduce the viscosity of the "unreduced paint" to a desired viscosity for coating application. The reducer contains one, or more than one, solvent with or without a resin. The solvent and the resin can be any of the solvents and resins described above. An "unreduced paint" refers to a coating composition before mixing with a reducer.

In addition, the coating composition of the present disclosure can also contain conventional additives, stabilizers, rheology control agents, flow agents, toughening agents and fillers. Selection of such additional additives will depend on the intended use of the coating composition. The foregoing additives may be added to either the crosslinkable or crosslinking component, or both, depending upon the intended use of the coating composition. Non-limiting examples of such additives are light stabilizers, for example, based on benztriazoles and HALS compounds, flow control agents based on (meth)acrylic homopolymers or silicone oils, rheology imparting materials, such as hydrophobic fumed silica, thickeners, such as cross-linked polycarboxylic acid or polyurethanes, anti-foaming agents, wetting agents, filler pigments, such as talc, china clay, barytes, carbonates, silicates and the like. In an exemplary embodiment, the solvent-borne coating composition further comprises at least one additive selected from the group of a crosslinking agent, an ultraviolet light stabilizer, an ultraviolet light absorber, an antioxidant, a hindered amine light stabilizer, a leveling agent, a rheological agent, a thickener, an antifoaming agent, and a wetting agent.

In an exemplary embodiment, optionally the coating composition includes a crosslinkable component and a crosslinking component. The term "crosslinkable component" is understood to mean a component that has functional groups appended thereon that are capable of reacting with the crosslinking component to form a crosslinked network. The crosslinkable component may include a compound, oligomer, polymer, or a combination thereof having at least one functional group reactive with the crosslinking component. In an exemplary embodiment, the crosslinkable component includes an acrylic polyol, as described above. The functional groups in the crosslinkable component can be chosen, for example, from hydroxy, amino, hydroxy silane, alkoxysilane, epoxy, carbamate, carboxy, anhydride, or a combination thereof. In an exemplary embodiment, the functional group is hydroxy. In an exemplary embodiment, the term "crosslinking component" refers to a component having "crosslinking functional groups" that are functional groups positioned in each molecule of the component, wherein these functional groups are capable of crosslinking with other functional groups in the coating composition (during the curing step) to produce a coating in the form of crosslinked structures. Suitable crosslinking functional groups can include isocyanate, thioisocyanate, alkylated melamine formaldehyde, acetoacetoxy, carboxyl, primary amine, secondary amine, epoxy, anhydride, ketamine, aldimine, or a combination thereof.

In an exemplary embodiment, the sag control agent (SCA) contemplated herein contains urea crystals. In one example, the urea crystal suitable for use herein is a reaction product of an amine and an isocyanate. In an exemplary embodiment, the amine monomer is a primary amine. The amine monomer can be selected from a secondary amine, diamines, ketamine, aldimine or a combination thereof. Examples of primary amines include benzyl amine, ethyl amine, I-propylamine, n-propylamine, I-butylamine, 2-butylamine, t-butylamine, n-pentylamine, 2-methyl-1-butylamine, I-hexylamine, 2-hexylamine, 3-hexylamine, octylamine, decylamine, laurylamine, stearylamine, cyclohexylamine, and aniline. Other suitable amines include alkyl ether amines, such as, for example, 2-aminoethanol alkyl ether, 3-aminopropanol alkyl ether, and 2-aminopropanol alkyl ether. Examples of secondary amines can include, for example, the N-alkyl derivatives of any of the primary amines listed above wherein alkyl means an alkyl radical having in the range of from 1 to 10 carbon atoms. Examples of diamines can include, aliphatic and cycloaliphatic diamines such as, for example, ethylene diamine, 1,2-propylenediamine, 1,3-diaminopropane, 1,4-butanediamine, neopentanediamine, 4,4-diaminodicyclohexylmethane, isophoronediamine, hexamethylenediamine, 1,12-dodecanediamine, piperazine, polyether diamines, polytrimethylene ether diamine or a combination thereof. In some embodiments, combinations of any of the above listed amines can also be suitable. In an exemplary embodiment, the amine monomer is selected from the group of benzyl amine, ethylamine, n-propylamine, 2-propylamine, n-butylamine, 2-butylamine, t-butylamine, n-pentylamine, α-methylbutylamine, α-ethylpropylamine, β-ethylbutylamine, hexylamine, octylamine, decylamine, stearylamine, cyclohexylamine, aniline, and combinations thereof. In one embodiment, the amine monomer is benzyl amine. The isocyanate monomer is chosen from a blocked or unblocked aliphatic, cycloaliphatic, heterocyclo, or aromatic di-, tri- or multivalent isocyanate, or a combination thereof. Examples of suitable diisocyanates include 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophorone diisocyanate, the adduct of 1 molecule of 1,4 butanediol and 2 molecules of isophorone diisocyanate, the adduct of 1 molecule of 1,4-butanediol and 2 molecules of hexamethylene diisocyanate, dicyclohexylmethane-4,4'-diisocyanate, xylylene diisocyanate, 1,3,5-trimethyl-2,4-bis (isocyanatomethyl)benzene, toluene diisocyanate, diphenylmethane-4,4'-diisocyanate, adducts of hexamethylene diisocyanate, adducts of isophorone diisocyanate, and adducts of toluene diisocyanate. Isocyanurate-trimers derived from diisocyanates are also suitable, as are combinations of the isocyanates. Any of the isocyanates mentioned above can be blocked or unblocked. In an exemplary embodiment, the isocyanate monomer is selected from the group of 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophorone diisocyanate, adduct isophorone diisocyanate, adduct of hexamethylene diisocyanate, dicyclohexylmethane-4,4'-diisocyanate, xylylene diisocyanate, 1,3,5-trimethyl-2,4-bis (isocyanatomethyl)benzene, toluene diisocyanate, diphenyl methane-4,4'-diisocyanate, adduct of toluene diisocyanate, and combinations thereof. In an exemplary embodiment, the isocyanate monomer is 1,6 hexamethylene diisocyanate.

The sag control agent (SCA) containing urea crystals can further contain a moderating resin, which is in the presence of the reaction of the isocyanate and the amine. The moderating resin can be one or more of the aforementioned resins. In an exemplary embodiment, the moderating resins include acrylic polymers or polyesters.

In an exemplary embodiment, the wax dispersion provides thixotropic behavior during application conditions. In one embodiment, the wax dispersion includes poly(ethylene-co-vinyl acetate) (EVA)-based wax particles or dispersions, for example EVA-based particles, EVA wax particles and/or copolymer wax particles including EVA and/or a blend of copolymers containing EVA wax particles. Various EVA-based wax particles or dispersions are commercially available, for example, under the trade name A.C.® from Honeywell, USA or trade name CERAFAK® or CERATIX® from BYK, Germany. In an exemplary embodiment, the wax particles or pastes are dispersed to form a wax dispersion in a solvent or a solvent mixture. The process includes heating the wax particles in a solvent or a solvent mixture under mixing, the mixture is then cooled down to room temperature. In an exemplary embodiment, the concentration of the wax particles is from about 3 to about 10 wt. %, such as from about 4 to about 7 wt. % in the solvent or solvent mixture. In an exemplary embodiment, the average particle size is from about 1 to about 20 micrometers. Particle size measurement may be determined using a grindometer.

In another embodiment, the wax dispersion includes polyamide-based wax particles. Various polyamide-based (PA) wax pastes or dispersions are also commercially available, for example, under trade name Disparlon® (King Industries, USA, Kusumo, Japan) or trade name THIXATROL® (Elementis, UK). The polyamide wax pastes are processed into dispersions with a solvent or a solvent mixture and one or more resin(s) by homogenizing or conventional mixing techniques. In an exemplary embodiment, the average particle size of PA wax particles is from about 5 to about 30 micrometers. Likewise, the particle size measurement may be determined using a grindometer.

In an exemplary embodiment, the amount of SCA and wax particles is determined based on the coating composition, such as RTS volume solids level and amount of high molecular weight and high Tg resins, such as cellulosic resins, to balance flake control and appearance.

The following examples are provided for illustration purposes only and are not meant to limit the various embodiments of the coating composition in any way.

EXAMPLES

All silver paint samples had 20 weight percentage of aluminum to total binder. Al paste was SSP-353 from Silberline Manufacturing Co., Tamaqua, Pa. Each sample had 10 wt. % of Cellulose Acetate Butyrate (CAB-381-20, from Eastman Chemical Co.) relative to total binder. Also, each sample contained various amount of an acrylic resin A, which was prepared through a free-radical copolymerization of the following monomers in methyl amyl ketone.

| | |
|---|---|
| Butyl acrylate monomer | 19.5 wt. % |
| Methacrylic acid monomer | 3.1 wt. % |

-continued

| | |
|---|---|
| Isobornyl acrylate monomer | 12.6 wt. % |
| Hydroxy ethyl methacrylate monomer | 4.7 wt. % |
| Hydroxy propyl methacrylate monomer | 4.7 wt. % |
| Styrene monomer | 18.3 wt. % |

The resulting acrylic polymer solution had a polymer solids content of about 63 wt. % and a Gardner-Holdt viscosity of about Z.

All silver paint samples were reduced with 7175S (Chromabase® basemaker from Axalta Coating Systems, PA) at 2:1 volume ratio to form ready-to-spray paints. Clearcoat 8035 (from Axalta Coating Systems Co., PA) was sprayed on the flashed basecoat panels. The clearcoated panels were then baked at 60° C. (140° F.) for 30 minutes. The colors of the panels were measured by an Acquire™ Quantum EFX spectrophotometer available from Axalta Coating Systems Co. Metallic "Flop" is usually used to characterize flake orientation. While using the same effect pigments and illumination conditions, the bigger the value of "Flop", the better the flake orientation. The term "Flop" is mathematically defined as Flop=2.69*(L15-L110)^1.11/(L45)^0.86. In this equation, L15, L45 and L110 are the lightness or light intensity measured at an aspecular angle of 15 degrees, 45 degrees and 110 degrees, respectively. The angle is determined by reference to the specular angle which is 45 degrees from normal. Larger L15 and Flop values usually indicate better flake control. As noted above, the term "mottling" is used to describe the irregular areas of lightness variation of an effect color appearance. The mottling values (M15 and M45) of the tested panels were measured by a cloud-runner instrument (from BYK-Gardner GmbH, Bad Tölz, Germany). The smaller the mottling value is, the more uniform the finished appearance will be. According to the recommendation from BYK-Gardner GmbH, M15 is used to characterize uniformity of effect color appearance. When M15 is larger than 6, mottling appearance is considered as "clearly noticeable". When M15 is from 4.5 to 6, mottling appearance is considered "visible". When M15 is below 4.5, mottling appearance is considered as "hard to recognize". In an exemplary embodiment, it is suitable that M15 is less than about 4.5. M15 and M45 represent mottling appearance measured at aspecular angles of 15 degrees and 45 degrees, respectively. The angle is determined by reference to the specular angle which is 45 degrees from normal. Long wave (LW) and short wave (SW) were measured with a Wave-Scan Dual (from BYK-Gardner GmbH, Bad Tölz, Germany). The smaller both LW and SW are, the smoother the finished appearance will be.

I. EVA Wax and SCA Example

Samples in Table 1 have a ready-to-spray volume solid of 16%. The weight percent relative to total binder of EVA wax particles, SCA1 urea crystals and Resin 1 solids are listed in Table 1, respectively. 10 wt. % of the binder is CAB-381-20 as stated above. The rest of the binder is acrylic resin A.

TABLE 1

| Example | EVA Wax | SCA1 | EVA Wax + SCA1 | Resin 1 | M15 | M45 | Flop | L15 | LW | SW |
|---|---|---|---|---|---|---|---|---|---|---|
| 1 | 0 | 6 | 6 | 75 | 5.6 | 5.9 | 15.7 | 143 | 0.7 | 6.8 |
| 2 | 0 | 4 | 4 | 25 | 7.5 | 7.2 | 15.7 | 144 | 1.9 | 9.0 |
| 3 | 6 | 0 | 6 | 25 | 3.2 | 4.2 | 17.8 | 147 | 1.2 | 8.1 |
| 4 | 6 | 2 | 8 | 25 | 3.0 | 3.5 | 17.9 | 146 | 0.7 | 8.1 |
| 5 | 4 | 0 | 4 | 25 | 4.2 | 5.4 | 17.8 | 147 | 0.6 | 7.0 |
| 6 | 4 | 2 | 6 | 25 | 3.2 | 4.2 | 17.9 | 147 | 0.5 | 6.0 |
| 7 | 4 | 6 | 10 | 75 | 3.1 | 3.8 | 17.4 | 146 | 0.3 | 3.4 |
| 8 | 3 | 6 | 9 | 75 | 3.4 | 4.1 | 16.9 | 145 | 0.2 | 3.1 |

TABLE 1-continued

| Example | EVA Wax | SCA1 | EVA Wax + SCA1 | Resin 1 | M15 | M45 | Flop | L15 | LW | SW |
|---|---|---|---|---|---|---|---|---|---|---|
| 9 | 2 | 6 | 8 | 75 | 3.6 | 4.3 | 16.4 | 145 | 0.2 | 3.9 |
| 10 | 2 | 4 | 6 | 75 | 3.5 | 4.2 | 16.4 | 145 | 0.3 | 4.0 |
| 11 | 7 | 0 | 7 | 25 | 3.6 | 4.3 | 17.1 | 145 | 1.2 | 9.5 |
| 12 | 7 | 0.5 | 7.5 | 25 | 3.4 | 3.9 | 16.9 | 145 | 1.1 | 10.8 |
| 13 | 7 | 1 | 8 | 25 | 3.0 | 3.7 | 17.3 | 145 | 1.4 | 10.5 |
| 14 | 8 | 0 | 8 | 25 | 3.9 | 4.9 | 14.5 | 140 | 3.0 | 22.1 |
| 15 | 8 | 0.5 | 8.5 | 25 | 3.3 | 4.1 | 15.5 | 142 | 1.4 | 22.6 |
| 16 | 8 | 3 | 11 | 25 | 3.4 | 4.5 | 16.8 | 145 | 2.3 | 24.5 |
| 17 | 9 | 0 | 9 | 25 | 3.6 | 4.3 | 14.7 | 141 | 2.5 | 27.4 |
| 18 | 9 | 0.5 | 9.5 | 25 | 3.4 | 4.1 | 15.1 | 141 | 3.3 | 28.5 |
| 19 | 9 | 2 | 11 | 25 | 4.0 | 4.4 | 15.9 | 143 | 3.2 | 27.7 |
| 20 | 8 | 0 | 8 | 50 | 3.7 | 4.2 | 16.7 | 147 | 1.3 | 14.4 |
| 21 | 8 | 1 | 9 | 50 | 3.2 | 3.9 | 16.0 | 146 | 0.6 | 15.5 |
| 22 | 8 | 3 | 11 | 50 | 3.4 | 4.1 | 15.6 | 143 | 1.8 | 18.1 |
| 23 | 8 | 0 | 8 | 75 | 3.4 | 4.3 | 16.0 | 145 | 0.6 | 9.0 |

* EVA wax is A.C. ® 405-T from Honeywell. The wax dispersion is prepared at 6.0 wt. % of wax particles in presence of 54.1 wt. % of butyl acetate and 39.9 wt. % of xylene. SCA1 is produced by reacting 2.8 wt. % benzyl amine with 2.2 wt. % 1,6 hexamethylene diisocyanate in the presence of 77.9 wt. % of Resin 1 and 17.1 wt. % of solvent isopentyl acetate. The SCA1 contains about 67.3 wt. % of solid, including 5.0 wt. % of urea crystals of the total weight of SCA1. The Resin 1 is a branched polyester having a weight average molecular weight of about 9,900 and Tg of −30° C. The resin solution is 80 wt. % solid in N-butyl alcohol.

The data presented in Table 1 provides a comparison between binder compositions and the properties of the basecoat. Examples 1 and 2 show that compositions free of EVA wax and including SCA1 result in basecoats with unacceptably high mottling. The difference between Examples 1 and 2 with respect to the total amount of polyester resin solids (Resin 1) will be discussed in further detail below. Examples 11, 14, and 17 show that in compositions free of SCA1, increasing the amount of EVA wax from 7 wt. % to 8 wt. % to 9 wt. % based on the total weight of binder results in a significant increase in texture (i.e., unsmooth appearance). Comparing Examples 1, 3, and 6 that have different amounts of EVA wax and SCA1 but the same total amount of EVA wax plus SCA1 (i.e., 6 wt. %), it is shown that compositions including both EVA wax and SCA1 have significantly improved mottling and similar smoothness to those having only SCA1 and similar mottling and improved smoothness to those having only EVA wax. Examples 11, 12, and 13 show that increasing SCA1 in compositions having the same amount of EVA wax results in improved mottling without a significant increase in texture (i.e., unsmooth appearance). This can also be seen from a comparison between Examples 14 and 15. Notably, however, a comparison between Examples 15 and 16 shows that when the total amount of EVA wax plus SCA1 is greater than 10 wt. % based on the total weight of binder, the trend in improved mottling for an increase in the amount of SCA1 is no longer observed. Moreover, Examples 15 and 16 further show that an increase in texture (i.e., unsmooth appearance) is still observed with an increase in the amount SCA1 when the total amount of EVA wax plus SCA1 is greater than 10 wt. % based on the total weight of binder. Examples 9 and 10 show that when the amount of EVA wax is below 3 wt. % based on the total weight of the binder, the flop is low, indicating poorer orientation of the flake pigments. Additionally, these examples show that increasing the amount of SCA1 does not further improve mottling or smoothness when the amount of EVA wax is below 3 wt. % based on the total weight of the binder. Examples 17, 18, and 19 show that when the amount of EVA wax is above 8 wt. % based on the total weight of the binder, increasing the amount of SCA1 does not further improve mottling or smoothness.

TABLE 2

| Example | EVA Wax | SCA1 | EVA Wax + SCA1 | Resin 1 | Basecoat Persoz Hardness (sec) | Basecoat + Clearcoat Persoz Hardness (sec) |
|---|---|---|---|---|---|---|
| 14 | 8 | 0 | 8 | 25 | 141 | 58 |
| 20 | 8 | 0 | 8 | 50 | 25* | 60 |
| 23 | 8 | 0 | 8 | 75 | 16* | 48 |

*In the above Table 2, an asterisk indicates that there were dents observed in the coating during measurement of Persoz Hardness, indicating substantially low hardness of the coating.

The data presented in Table 2 provides a comparison between binder compositions and the properties of the basecoat. The Examples listed in Table 2 correspond to the compositions listed in Table 1, but the compositions are repeated in Table 2 for clarity. Persoz hardness testing was carried out by ASTM D4366 on the samples after drying at room temperature for 7 days. Curing the film for seven days provides sample time for evaporation of the solvent(s) from the basecoat so that there is minimal to no impact on the hardness due to remaining solvent(s) present in the basecoat. In an exemplary embodiment, it is suitable if the Persoz hardness is more than about 40 seconds as measured in accordance with ASTM-D4366.

Examples 14, 20, and 23 all have the same amount of EVA wax (i.e., 8 wt. %), SCA1 (i.e., 0 wt. %), and CAB-381-20 (i.e., 10 wt. %), which includes cellulosic resin solids. However, each of these examples contains a different amount of polyester resin solids (Resin 1) and acrylic resin solids (Resin A). These examples show that significantly increasing the amount of polyester resin solids (Resin 1) while decreasing the amount of acrylic resin solids (Resin A) improves smoothness without negatively impacting mottling. However, it is shown that increasing the amount of polyester resin solids while decreasing the amount of acrylic resin solids decreases the Persoz hardness of the basecoat layer. This is undesirable in basecoats as tacky, soft, and/or malleable basecoats prevent effective nib sanding of the basecoat before application of, for example, a clearcoat. Additionally, this is undesirable in topcoats as malleable topcoats are too soft for handling and/or usage. The basecoats of Examples 20 and 23 have an unacceptable Persoz hardness that is too tacky to effectively perform nib sanding on. However, the basecoat plus clearcoat for Example 20 has a similar Persoz hardness to Example 14. This shows that the effect is less pronounced when a clearcoat is applied.

TABLE 3

| Component | Wt. % in Binder | Wt. % in Paint Before Reduction |
|---|---|---|
| Aluminum Flake | 0 | 5.1 |
| EVA Wax | 4 | 1.0 |
| SCA1 | 6 | 1.5 |
| Resin 1 | 75 | 19.1 |
| CAB-381-20 | 10 | 2.6 |
| Resin A | 5 | 1.3 |
| Solvent(s) | 0 | 69.3 |
| Total | 100 | ~100 (99.9) |

The data in Table 3 shows the composition of the binder and the paint before reduction for Example 7 as shown in Table 1 above. The binder is present in the paint before reduction in an amount of 25.6 wt. % based on the total weight of the paint before reduction. As discussed above, the binder includes any of a class of nonvolatile, solid or semisolid organic substances. This does not include, for example, solvent(s). As basecoats are typically cured and/or dried, the volatile components, such as solvents, substantially evaporate from the basecoat. Accordingly, the composition of the binder is particularly important.

II. PA Wax and SCA Example

The RTS volume solids level of each sample is shown in Table 4. The weight percent relative to total binder of PA wax particles, SCA2 urea crystals and Resin 2 solids are listed in Table 4, respectively. 10 wt. % of the binder is CAB-381-20 as stated above. The rest of the binder is acrylic resin A.

TABLE 4

| Example | RTS Vol Sol | PA Wax | SCA2 | PA Wax + SCA2 | Resin 2 | M15 | M45 | Flop | L15 | LW | SW |
|---|---|---|---|---|---|---|---|---|---|---|---|
| 24 | 16 | 0 | 3 | 3 | 75 | 6.9 | 6.6 | 16.3 | 144 | 0.6 | 7.3 |
| 25 | 16 | 0 | 4 | 4 | 65 | 6.9 | 6.6 | 16.0 | 143 | 0.9 | 10.7 |
| 26 | 16 | 6 | 0 | 6 | 75 | 3.3 | 4.1 | 18.1 | 146 | 5.4 | 17.7 |
| 27 | 16 | 5 | 0 | 5 | 75 | 4.4 | 5.1 | 17.3 | 146 | 3.2 | 14.2 |
| 28 | 16 | 5 | 1 | 6 | 75 | 3.7 | 4.1 | 17.8 | 146 | 3.1 | 16.5 |
| 29 | 16 | 1.5 | 1 | 2.5 | 65 | 3.2 | 3.8 | 17.7 | 147 | 2.3 | 10.3 |
| 30 | 14 | 6 | 0 | 6 | 75 | 3.1 | 3.8 | 18.3 | 146 | 3.0 | 14.5 |
| 31 | 14 | 3 | 6 | 9 | 65 | 3.3 | 4.2 | 17.9 | 146 | 0.8 | 7.5 |

* PA wax is Disparlon ® EZ-777 from King Industries, Inc. Norwalk, CT. The 25 wt. % of PA wax is dispersed in the presence of Resin 2 (15 wt. %), 40 wt. % xylene and 20 wt. % of butyl acetate. SCA2 is produced by reacting 1.7 wt. % of benzyl amine (from BASF of Florham Park, New Jersey) with 1.3 wt. % of 1,6 hexamethylene diisocyanate in the presence of 96.4 wt. % of Resin 2 and 0.6 wt. % of t-butyl acetate. The SCA2 contains 61.0 wt. % solid, including 3.0 wt. % of urea crystals based on the total weight of SCA2. Resin 2 is an acrylic resin with a weight average molecular weight of about 10,000 and Tg of 18° C. The resin solution is 60.2 wt. % solid in t-butyl acetate and has a Gardner-Holdt viscosity of about Y.

Table 4 shows that Examples 24 and 25 with SCA2 and no PA-based wax particles only have smooth appearance but unacceptable mottling. Unexpectedly, adding SCA2 into samples with PA-based wax particles permits achievement of coatings with a good balance of smoothness, hiding power and reduced mottling at lower levels of PA-based wax particles compared to samples with PA-based wax particles only. Exemplary formula: Examples 28, 29, and 31.

As compared to EVA-based wax particles, similar amounts of PA-based wax particles result in unreduced paint compositions and reduced paint compositions having higher viscosities. This effect is more pronounced as volume solid content of the paint is increased. High viscosity in paint compositions are undesirable as they are more difficult to mix and more difficult to atomize in spray application, for example. This can further result in uneven spray patterns, clogging of the atomizer spray head, and the formation of agglomerates in the paint composition. Accordingly, including SCA2 in such compositions allows the total amount of PA-based wax particles in the compositions to be lowered without negatively influencing the smoothness and mottling of the resultant coating.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It is understood that various changes may be made in the function and arrangement of elements described in an exemplary embodiment without departing from the scope of the disclosure as set forth in the appended claims.

What is claimed is:

1. A solvent-borne coating composition comprising:
   one or more solvents;
   one or more colorants, wherein the one or more colorants comprises a flake pigment;
   a binder comprising one or more resins;
   a sag control agent comprising urea crystals that are present in an amount of from about 0.5 wt. % to about 6 wt. % based on the weight of the binder, wherein the sag control agent comprises a reaction product of benzyl amine and 1,6-hexamethylene diisocyanate; and
   a wax dispersion comprising ethylene vinyl acetate (EVA)-based wax particles that are present in an amount of from about 3 wt. % to about 8 wt. % based on the weight of the binder, wherein the solvent-borne coating composition has a non-volatile content of from about 11 vol. % to about 30 vol. % based on the volume of the solvent-borne coating composition.

2. The solvent-borne coating composition of claim 1, wherein the non-volatile content of the solvent-borne coating composition is from about 12 vol. % to about 25 vol. % based on the volume of the solvent-borne coating composition.

3. The solvent-borne coating composition of claim 1, wherein the sag control agent and the wax dispersion are present in a combined total amount of less than or equal to about 11 wt. % based on the weight of the binder.

4. The solvent-borne coating composition of claim 1, wherein the urea crystals and the EVA-based wax particles are present in a combined total amount of from about 3.5 wt. % to about 10 wt. % based on the weight of the binder.

5. The solvent-borne coating composition of claim 1, wherein the flake pigment includes at least one flake pigment selected from the group of aluminum flakes, mica flakes, and pearlescent flakes.

6. The solvent-borne coating composition of claim 1, wherein the one or more resins comprises one or more resins selected from the group of acrylic resin, polyester-extended acrylic resin, acrylic polyol resin, polyester resin, polyester-extended polymer, and cellulosic resin.

7. The solvent-borne coating composition of claim 6, wherein the one or more resins includes polyester resin(s) that is present in an amount of less than or equal to about 75 wt. % based on the weight of the binder.

8. The solvent-borne coating composition of claim 1, wherein when the solvent-borne coating composition is sprayed on a substrate and subsequently cured for 7 days at room temperature to form a basecoat, the basecoat has a Persoz hardness of more than about 40 seconds as measured in accordance with ASTM-D4366.

9. The solvent-borne coating composition of claim 1, wherein the solvent-borne coating composition further comprises at least one additive selected from the group of a crosslinking agent, an ultraviolet light stabilizer, an ultraviolet light absorber, an antioxidant, a hindered amine light stabilizer, a leveling agent, a rheological agent, a thickener, an antifoaming agent, and a wetting agent.

10. A method for forming a coated substrate, the method comprising the steps of:
spraying the solvent-borne coating composition of claim 1 onto a substrate; and
drying, curing, and/or baking the solvent-borne coating composition on the substrate to form a first coating layer on the substrate.

11. The method of claim 10, further comprising the steps of:
applying a clearcoat overlaying one of the solvent-borne coating composition and the first coating layer; and
drying, curing, and/or baking the clearcoat to form the coated substrate.

12. The method of claim 11, further comprising the step of:
nib sanding the first coating layer prior to applying the clearcoat.

13. The method of claim 11, wherein the coated substrate is formed having a mottling appearance of less than about 4.5 as measured by a cloud-runner instrument at an aspecular angle of about 15 degrees.

14. A solvent-borne coating composition comprising:
one or more solvents;
one or more colorants, wherein the one or more colorants comprise a flake pigment;
a binder comprising one or more resins;
a sag control agent comprising urea crystals that are present in an amount of from about 0.5 wt. % to about 6 wt. % based on the weight of the binder, wherein the sag control agent comprises a reaction product of benzyl amine and 1,6-hexamethylene diisocyanate; and
a wax dispersion comprising polyamide (PA)-based wax particles present in an amount of from about 1 wt. % to about 5 wt. % based on the weight of the binder, wherein the solvent-borne composition has a non-volatile content of from about 11 vol. % to about 30 vol. % based on the volume of the solvent-borne coating composition.

15. The solvent-borne coating composition of claim 14, wherein the sag control agent and the wax dispersion are present in a combined total amount of from about 2.5 wt. % to about 9 wt. % based on the weight of the binder.

* * * * *